(12) United States Patent
Ishino et al.

(10) Patent No.: US 8,550,441 B2
(45) Date of Patent: Oct. 8, 2013

(54) SUPPORTING MEMBER AND CARRIER, AND METHOD OF SUPPORTING

(75) Inventors: Koji Ishino, Odawara (JP); Hajime Nakamura, Naka-gun (JP); Mayako Matsuda, Chigasaki (JP); Takaaki Shindou, Ebina (JP); Yukio Kikuchi, Chigasaki (JP)

(73) Assignee: ULVAC, Inc., Chigasaki-Shi (JP)

( * ) Notice: Subject to any disclaimer, the term of this patent is extended or adjusted under 35 U.S.C. 154(b) by 537 days.

(21) Appl. No.: 12/596,926

(22) PCT Filed: Apr. 16, 2008

(86) PCT No.: PCT/JP2008/057448
§ 371 (c)(1),
(2), (4) Date: Jan. 25, 2010

(87) PCT Pub. No.: WO2008/133149
PCT Pub. Date: Nov. 6, 2008

(65) Prior Publication Data
US 2010/0117280 A1 May 13, 2010

(30) Foreign Application Priority Data

Apr. 23, 2007 (JP) ................................. 2007-113226

(51) Int. Cl.
*B23Q 1/64* (2006.01)
*B23Q 7/00* (2006.01)

(52) U.S. Cl.
USPC .......... 269/111; 269/254 R; 269/311; 269/57; 414/757; 414/783; 29/559

(58) Field of Classification Search
USPC ..... 198/803.3, 803.4, 803.7, 803.8; 206/724; 269/109, 111, 113, 254 CS, 254 R, 305, 311, 269/314, 57, 900, 903; 29/559; 414/757, 414/783, 941
IPC ........... B65G 46/06; C03B 35/00, 35/20; H01L 21/683, 21/687
See application file for complete search history.

(56) References Cited

U.S. PATENT DOCUMENTS 1,221,601 A * 4/1917 Rowland ...................... 269/109
3,175,820 A * 3/1965 Schiler ......................... 269/296

(Continued)

FOREIGN PATENT DOCUMENTS

| JP | 4-125222 | 4/1992 |
| JP | 04271138 | 9/1992 |

(Continued)

OTHER PUBLICATIONS

International Search Report dated May 27, 2008 issued in related International Patent Application No. PCT/JP2008/057448.

(Continued)

*Primary Examiner* — Lee D Wilson
*Assistant Examiner* — Tyrone V Hall, Jr.
(74) *Attorney, Agent, or Firm* — Grossman, Tucker, Perreault & Pfleger, PLLC

(57) ABSTRACT

A supporting member, carrier and method of supporting are provided with a supporting member main body mounted to freely rotate. The supporting member main body is provided with a plurality of projections extending radially from a central rotation axis. Since the substrate is supported by abutment of the projections with an end of the substrate, the occurrence of cracking in the substrate can be prevented or the durability of the supporting member main body can be increased.

9 Claims, 10 Drawing Sheets

(56) References Cited

U.S. PATENT DOCUMENTS

| | | | |
|---|---|---|---|
| 3,297,134 A * | 1/1967 | Pastuszak | 198/379 |
| 4,291,867 A * | 9/1981 | Williams et al. | 269/43 |
| 4,473,455 A * | 9/1984 | Dean et al. | 204/298.15 |
| 4,646,418 A * | 3/1987 | Hattori | 29/559 |
| 4,759,488 A * | 7/1988 | Robinson et al. | 228/43 |
| 4,971,676 A * | 11/1990 | Doue et al. | 118/503 |
| 5,326,147 A * | 7/1994 | Watson | 294/162 |
| 5,501,436 A * | 3/1996 | Miller | 269/47 |
| 5,700,297 A * | 12/1997 | Vollaro | 29/25.01 |
| 5,851,041 A * | 12/1998 | Anderson et al. | 294/106 |
| 5,961,107 A * | 10/1999 | Morghen | 269/47 |
| 6,328,296 B2 * | 12/2001 | Tyveleijn | 269/297 |
| 6,536,755 B2 * | 3/2003 | Meron et al. | 269/91 |
| 6,764,272 B1 * | 7/2004 | Nuxoll et al. | 414/754 |
| 6,811,131 B2 * | 11/2004 | Kuo | 248/346.03 |
| 6,824,343 B2 * | 11/2004 | Kurita et al. | 414/217 |
| 2002/0051697 A1 * | 5/2002 | Ko et al. | 414/193 |
| 2002/0064450 A1 * | 5/2002 | Coomer et al. | 414/939 |
| 2002/0197144 A1 * | 12/2002 | Blank et al. | 414/757 |
| 2004/0005212 A1 * | 1/2004 | Wu | 414/757 |
| 2005/0179187 A1 * | 8/2005 | Huang et al. | 269/305 |
| 2006/0144738 A1 * | 7/2006 | Han et al. | 206/454 |

FOREIGN PATENT DOCUMENTS

| | | | |
|---|---|---|---|
| JP | 7231035 | | 8/1995 |
| JP | 11121596 | | 4/1999 |
| JP | 11238783 | | 8/1999 |
| JP | 11238783 A | * | 8/1999 |
| JP | 2004315146 | | 11/2004 |
| JP | 2004315146 A | * | 11/2004 |
| JP | 2006114675 | | 4/2006 |
| JP | 2006-191039 | | 7/2006 |
| JP | 2007-262539 | | 10/2007 |

OTHER PUBLICATIONS

Notice of Allowance from corresponding Japanese Application No. 2009-511832 dated Dec. 21, 2012. English translation attached.

Office Action from corresponding Japanese Application No. 2012-154111 dated Aug. 6, 2013. English translation attached.

* cited by examiner

SUPPORTING MEMBER AND CARRIER, AND METHOD OF SUPPORTING

TECHNICAL FIELD

The present invention relates to a supporting member and to a carrier for mounting the same. Priority is claimed on Japanese Patent Application No. 2007-113226, filed on Apr. 23, 2007, the contents of which are incorporated herein by reference.

BACKGROUND ART

In a manufacturing step for a liquid crystal display for example, a vacuum process such as a heating process or deposition process is performed for a large glass substrate. As a result, various vacuum processing devices have been developed. One of these devices uses an inline sputtering device to deposit an ITO film (electrode film) on the liquid crystal display on the side near the color filter.

The inline sputtering device is a vacuum device which creates vacuum conditions and deposits a thin film on the glass substrate by using sputter. The glass substrate is attached to a carriage called a carrier for a stable transfer of the glass substrate in the sputtering apparatus.

Furthermore when depositing a film on a particularly large glass substrate, there is a method to deposit the glass substrate is placed substantially vertical to the carrier. In this case, the lower side of the glass substrate is mounted on a substrate receiver (supporting member) mounted on the side with the carrier.

Patent Document 1: Japanese Unexamined Patent Publication, First Publication No. 2006-114675 (FIG. 11)

DISCLOSURE OF THE INVENTION

Problem to be Solved by the Invention

The substrate receiver is formed in a substantially quadrilateral shape. A plurality of substrate receivers are mounted and fixed to the abutment position of the lower side of the glass substrate on the side with the carrier (For example, refer to Japanese Unexamined Patent Application, First Publication No. 2006-114675). However, since it is difficult to make parallel contact of the lower side of the glass substrate and the upper side of the substrate receiver, these edges do not make face contact but point contact (line contact).

That is, as shown in FIG. 14, for example, even if the substrate receivers 118 are mounted at three positions, the glass substrate 111 and the substrate receiver 118 (118a-118c) make point contact (line contact) at only two positions which are the corner of the substrate receiver 118a and the corner of the substrate receiver 118c. Consequently the substrate receiver 118b may not be in contact with the glass substrate 11.

In addition, when the glass substrate transferred by a transfer device (robot) is placed in contact with the substrate receiver of the carrier, the glass substrate is simply dropped into abutment from a height of several millimeters above the substrate receiver. Accordingly, in the above example and so on, stress becomes concentrated by the instantaneous application of the load of the glass substrate on the two positions. Consequently, since a crack may be formed in the glass substrate, there is a possibility to decrease productivity. Furthermore, the substrate may fracture as a result of a crack during subsequent conveying steps, deposition steps and base-plate attachment/detachment steps. Furthermore, wear may result on the substrate receiver side due to frictional contact between the glass substrate and the substrate receiver. Consequently, the horizontal level of a plurality of substrate receivers may deviate resulting in the problem that the horizontal characteristics of the glass substrate are not maintained.

The present invention is proposed in view of the above problems and has the object of providing a supporting member and carrier in order to enable prevention of cracking in a substrate and long-term durability for the supporting member main body.

Means for Solving the Problem

A first aspect of the present invention is characterized in that a supporting member main body is mounted to rotate freely. The supporting member main body is provided with a plurality of projections extending radially from a central axis of rotation and the projections are placed in abutment with an end of the substrate to thereby support the substrate.

Consequently, when the substrate abuts with the supporting member, first contact is made with a point of a projection of the supporting member main body and the load from the substrate is applied onto the supporting member. Consequently, the supporting member main body rotates to thereby place the substrate into contact with an adjacent projection and, as a result, support of the substrate is ensured at two points with a single supporting member. Thus, concentration of stress on the substrate can be mitigated thereby preventing the occurrence of cracks in the substrate. As a result, productivity can be improved in substrate manufacturing steps.

The supporting member may include a biasing member which abuts with the supporting member main body and biases the supporting member main body towards the substrate.

In this case, when the substrate abuts with the supporting member, since the biasing member enables abutment while absorbing the impact force resulting from the load of the substrate, the occurrence of cracks in the substrate can be prevented.

The supporting member may interpose a resilient member between the supporting member main body and the central rotation axis.

In this case, when the substrate abuts with the supporting member, since the resilient member enables abutment while absorbing the impact force resulting from the load of the substrate, the occurrence of cracks in the substrate can be prevented.

The supporting member main body may be formed from resin.

In this case, since the supporting member main body is formed from a resilient material constituted by resin, when the substrate abuts with the supporting member, the occurrence of cracks in the substrate can be prevented.

The supporting member main body may be mounted to be detachable.

In this case, when a projection abutting with the substrate undergoes temporal wear, the supporting member main body may be removed, rotated and re-mounted so that another projection is placed in abutment with the substrate. In this manner, the supporting member main body can be continuously used and therefore the long-term durability of the supporting member main body can be improved.

Any of the above supporting members may be mounted on a carrier supporting the substrate.

Thus, suitable mounting of the supporting member on the carrier plays the role of receiving the load of the substrate and the role of an interference member when the substrate deviates to the left or right when conveyed.

The supporting member may be mounted on the carrier which supports the substrate in an upright position so that the supporting member abuts with the lower side of the substrate.

In this case, when the substrate is mounted on the carrier, the load of the substrate is accurately received by the supporting member. Furthermore, the load of the substrate is dispersed since the single supporting member has two supporting points. Thus, the occurrence of cracks in the substrate can be prevented.

The carrier which supports the substrate in an upright position may mount any of the supporting members above and the fixed supporting members abutting with the substrate along the lower side of the substrate with the supporting member can be mounted more towards the substrate than the fixed supporting member. The substrate may abut with and support the fixed supporting member after abutting with the supporting member.

In this case, when the substrate is fixed to the carrier, firstly the supporting member abuts with the substrate and the substrate is supported while absorbing the impact force resulting from the load of the substrate. The supporting member main body displaces downwardly due to the load of the substrate and the fixed supporting member and the substrate abut to thereby support the substrate. As a result, the occurrence of cracks in the substrate can be prevented and productivity in the substrate manufacturing steps is improved.

Since the substrate is supported at a plurality positions and the load of the substrate is dispersed and supported by the supporting member and the fixed supporting member, the substrate can be stably supported and the occurrence of cracks in the substrate can be prevented.

Effects of the Invention

According to the present invention, when the substrate abuts with the supporting member, first, contact is made with a point of a projection of the supporting member main body and a load from the substrate is applied onto the supporting member. Consequently, the supporting member main body rotates to place the substrate into contact with an adjacent projection. As a result, support of the substrate is ensured at two points with a single supporting member. Thus, the concentration of stress on the substrate can be mitigated. Furthermore, when the substrate abuts with the supporting member, the biasing member or the resilient member enables abutment while absorbing the impact force resulting from the load of the substrate. Thus, the occurrence of cracks in the substrate can be prevented and productivity can be improved in substrate manufacturing steps.

Furthermore, since the supporting member main body is formed from a resilient material constituted by resin, when the substrate abuts with the supporting member, the occurrence of cracks in the substrate can be prevented.

When the projection abutting with the substrate undergoes temporal wear, the supporting member main body may be removed, rotated and re-mounted so that another projection abuts with the substrate. In this manner, the supporting member main body can be continuously used and therefore the long-term durability of the supporting member main body can be improved.

DESCRIPTION OF THE REFERENCE NUMERALS

11 Glass Substrate (Substrate)
10 Carrier
18 Substrate Receiver (Supporting Member)
18a Moveable Substrate Receiver
18b Fixed Substrate Receiver (Fixed Supporting Member)
30 Main Body (Supporting Member Main Body)
31 Projection (Projection)
35 Plate Spring (Biasing Member)
63 Resilient Member

BEST MODES FOR CARRYING OUT THE INVENTION

Embodiment 1

The preferred embodiments of the present invention will be described hereafter making reference to FIG. 1 to FIG. 11. The size of each member in each figure used in the description hereafter have been suitable scaled down in order to enable each member to be in a size which can be recognized FIG. 1 is a perspective view showing the glass substrate mounted on the carrier.

Figure 1:
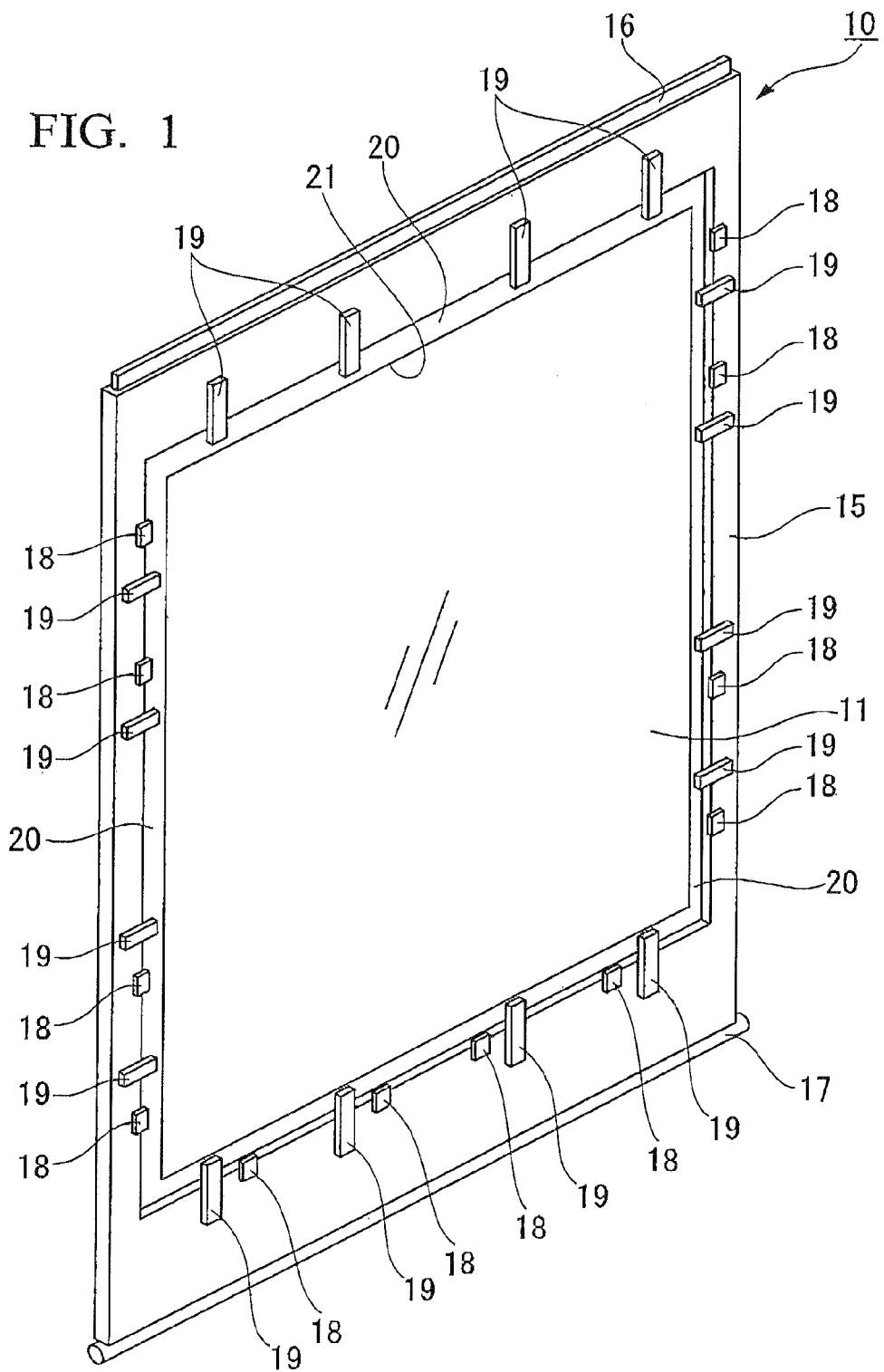
FIG. 1 is a perspective view showing the glass substrate mounted on the carrier according to an embodiment of the present invention.

As shown in FIG. 1, when conducting film deposition on a glass substrate 11, the glass substrate 11 is mounted on a frame termed a carrier 10 and the carrier 10 is transported using a conveyer described below to enable suitable performance of processing operations.

The carrier is disposed in an upright position to enable mounting of the glass base substrate 11. The carrier 10 includes a frame-shaped carrier frame 15 of aluminum or the like, a magnet 16 provided along an upper side of the carrier frame 15, and a slider 17 formed from round bars provided along a lower side of the carrier frame 15. In addition, a plurality of substrate receivers 18 for receiving a load from the glass substrate 11 and maintaining the horizontal level of the glass substrate 11 and a plurality of clamps 19 provided on a peripheral edge of an opening 21 of the carrier frame 15 for maintaining the glass substrate 11 on the carrier 10 are provided. A substrate receiver 18 for absorbing impacts, which is placed in abutment when the glass substrate 11 deviates to the right or left during conveying operations, is provided on both horizontal ends of the opening 21 of the carrier frame 15. A mask 20 covering the non-deposition region of the peripheral edge of the glass substrate 11 is integrally formed with the carrier frame 15 on a peripheral edge of the opening 21 of the carrier frame 15.

Figure 2:
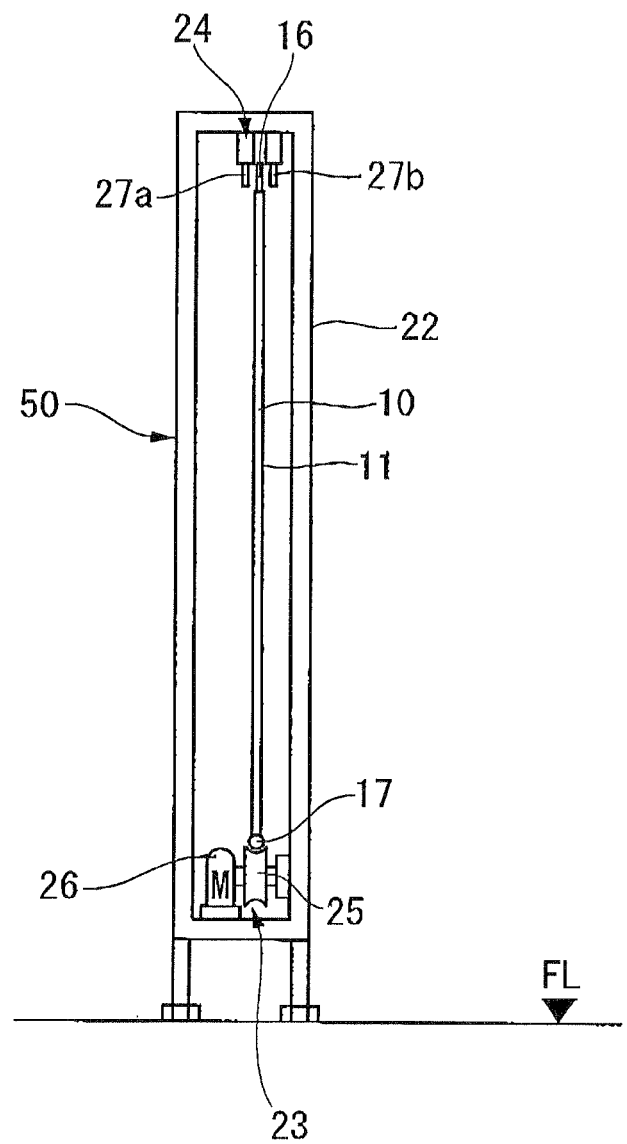
FIG. 2 is a side view showing the glass substrate mounted on the carrier according to an embodiment of the present invention.

FIG. 2 is a side view showing the glass substrate mounted on the carrier.

As shown in FIG. 2, the carrier 10 can be displaced by a conveyer 50 for example inside the deposition device. The conveyer 50 includes a frame 22 supported and fixed to the floor FL, and a lower support mechanism 23 and upper support mechanism 24 provided in the frame 22. In other words, the carrier 10 undergoes horizontal displacement along the conveying path (a groove on the outer peripheral side of the roller 25) by engaging the slider 17 provided on the lower side of the carrier 10 with a roller 25 of the lower support mechanism 23 and using a motor 2 to rotate the roller 25. Furthermore, the carrier 10 can be transferred while being maintained in a vertical orientation due to the repulsion between the magnet 16 provided on an upper side of the carrier 10 and the pair of magnets 27a, 27b forming the upper support mechanism 24.

Figure 3:
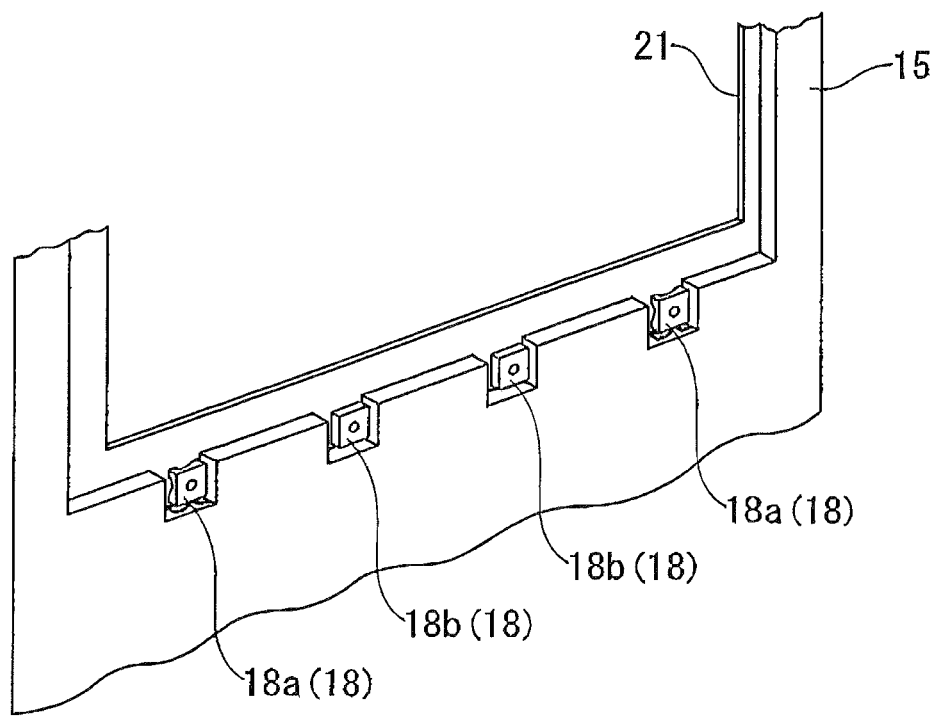
FIG. 3 is a partial detailed view of the carrier according to an embodiment of the present invention.

FIG. 3 is a partial detailed view of the carrier.

As shown in FIG. 3, in this embodiment, four substrate receivers 18 are provided on the carrier frame 15 along the lower side of the opening 21. The glass substrate 11 can abut with the substrate receivers 18. The four substrate receivers 18 include moveable substrate receivers 18a disposed on both sides of the carrier frame 15 and two inner fixed substrate receivers 18b. To facilitate description hereafter, the clamp 19 will be omitted from the figures.

Figure 4:
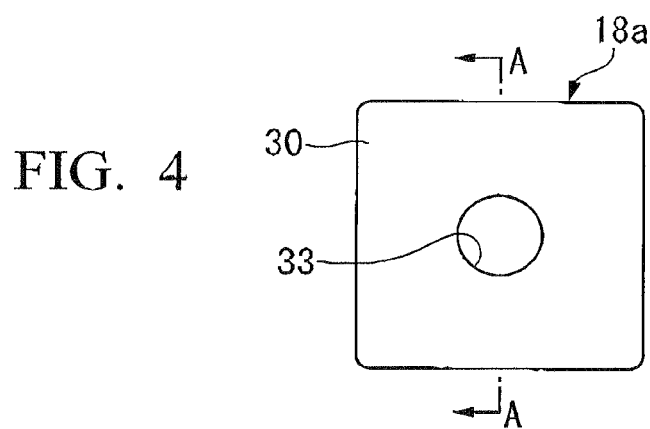
FIG. 4 is a front view of the main body of a moveable substrate receiver according to a first embodiment of the present invention.
Figure 5:
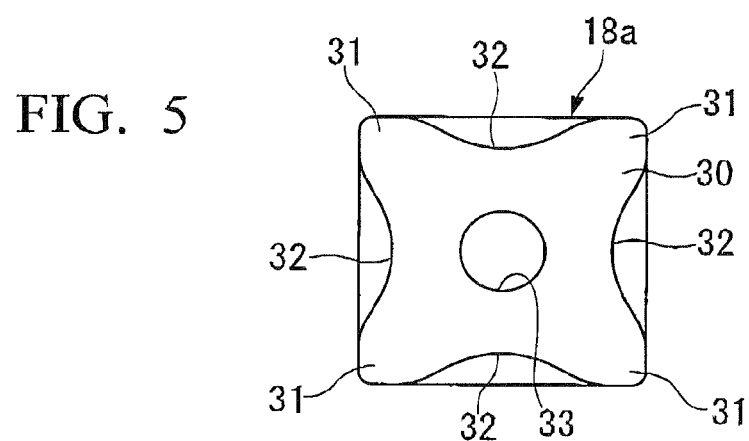
FIG. 5 is a back view of the main body of a moveable substrate receiver according to the first embodiment of the present invention.
Figure 6:
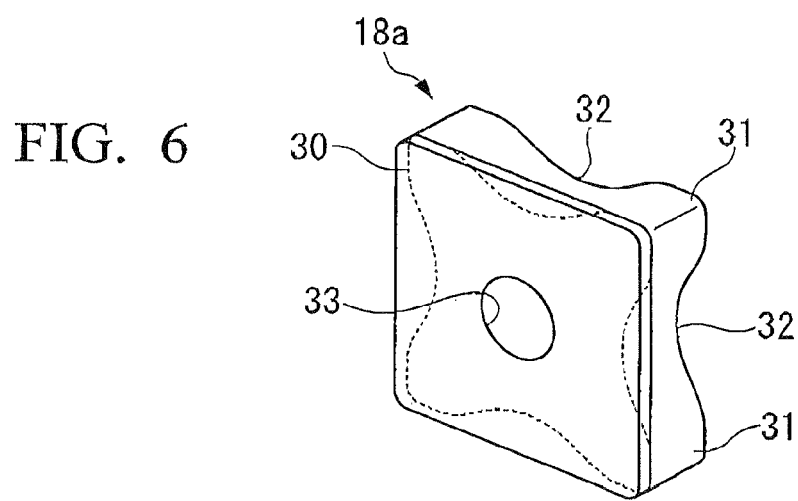
FIG. 6 is a perspective view of the main body of a moveable substrate receiver according to the first embodiment of the present invention.

FIG. 4 to FIG. 6 are a front view, a back view and a perspective view of the main body 30 of a moveable substrate receiver 18a.

As shown in FIG. 4 to FIG. 6, the main body 30 of the moveable substrate receivers 18a is formed from a resinous material. When the main body 30 mounted on the carrier frame 15 is viewed from the front, the main body 30 has a substantially quadrilateral shape having four corners formed into a band shape or round shape. When viewed from the back, a projection 31 is formed by cutting so that the four corners of the substantially quadrilateral shape are curved and an indentation 32 having substantially the same shape is respectively cut into the four sides of the quadrilateral shape. The thickness of the main body 30 is thicker than the thickness of the glass substrate 11 and the thickness of the indentation 32 is thicker than the thickness of the glass substrate 11. The main body 30 is formed from engineering plastic, that is, a resin such as polyimide or polyamide or a composite resin thereof.

Figure 7:
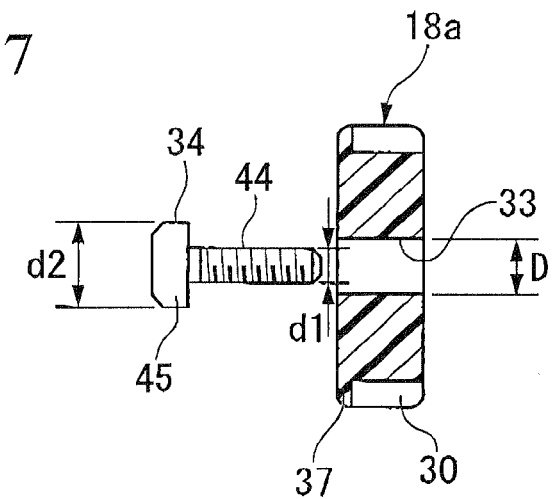
FIG. 7 is a sectional view along the line A-A in FIG. 4.

FIG. 7 is a sectional view along the line A-A in FIG. 4 showing a bolt 34.

As shown in FIG. 7, the main body 30 of the moveable substrate receiver 18a is provided with a through hole 33 in a substantially central section so that a bolt 23 can be inserted therein. The hole diameter D of the through hole 33 is larger than the outer diameter d1 of the shaft section 44 of the bolt 34 and is smaller than the outer diameter d2 of the head 4 of the bolt 34. The main body 30 is mounted by the bolt 34 on the carrier frame 15 and is mounted. However, the bolt 34 is not firmly fastened and the distance from the surface of the carrier frame 15 to the bottom of the head 45 of the bolt 34 is greater than the width (thickness) of the main body 30. That is, the main body 30 of the moveable substrate receiver 18a is displaceable.

Figure 8:
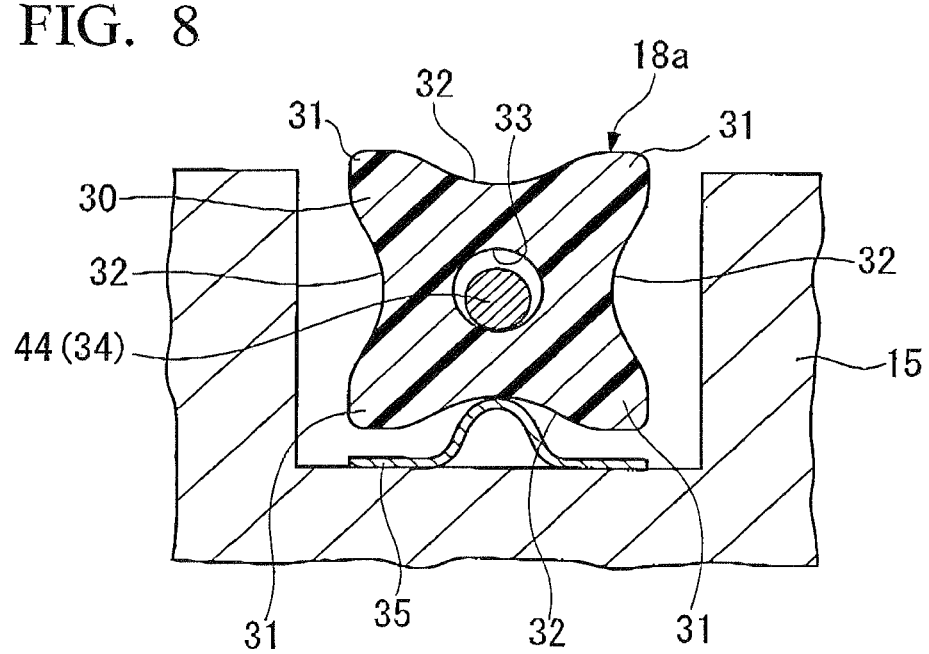
FIG. 8 is a sectional view showing the moveable substrate receiver mounted on the carrier frame according to the first embodiment of the present invention.

FIG. 8 is a sectional view showing the moveable substrate receiver 18a mounted on the carrier frame 15.

As shown in FIG. 8, the moveable substrate receiver 18a includes the main body 30 and a plate spring 35 having a substantially protruding shape which abuts with the indentation 32 on the lower end of the main body 30. The plate spring 35 is mounted on the carrier frame 15 to bias the main body 30 upwardly. When the glass substrate 11 is not in abutment with (mounted on) the moveable substrate receiver 18a, the main body 30 is biased by the plate spring 35 to an uppermost position. In other words, vertical displacement of the main body 30 is enabled by forming the hole diameter D of the through hole 33 larger than the outer diameter d1 of the shaft 44 of the bolt 34. The plate spring 35 is formed with a width enabling fitting between an overhang section formed with the surface of the carrier frame 15 and the surface of the main body 30. In this manner, detachment of the plate spring 35 can be prevented.

The main body 30 is not strongly fixed to the carrier frame 15. Therefore, the main body 30 is enabled to pivot around the shaft 44 of the bolt 34. However, since the plate spring 35 is mounted below the moveable substrate receiver 18a, the amount of rotation is not limited.

Referring again to FIG. 3, the main body 30 is formed from a low-elasticity resin material in a substantially quadrilateral shape which is thicker than the glass substrate 11. The fixed substrate receiver 18b is fixed strongly by the bolt 34 for example to the carrier frame 15. In this case, the fixed substrate receiver 18b is mounted so that one side of the four sides is substantially parallel to the lower side of the glass substrate 11. The fixed substrate receiver 18b may be formed from the same material as the moveable substrate receiver 18a or may be formed from a different resinous material having the substantially the same elastic characteristics.

When the glass substrate 11 is not mounted on the carrier 10, the upper end of the moveable substrate receiver 18a is mounted with a difference of elevation so that the position of the upper end of the moveable substrate receiver 18a is slightly towards (above) the glass substrate 11 in comparison to the position of the upper end of the fixed substrate receiver 18b (in this embodiment, 0.75 mm). The difference of elevation in the mounting position ensures that abutment is first made with the moveable substrate receiver 18a when the glass substrate 11 is mounted and, after the moveable substrate receiver 18a displaces downwardly as a result of the load of the glass substrate 11, the difference of elevation may be provided enabling abutment of the glass substrate 11 with the fixed substrate receiver 18b.

A plurality of moveable substrate receivers 18a is mounted on both horizontal ends of the opening 21 of the carrier frame 15. When the glass substrate 11 is mounted, a space is formed between the glass substrate 11 and the moveable substrate receiver 18a mounted on both horizontal ends of the glass substrate 11. Thus, even if the glass substrate 11 deviates to the left or the right when the carrier 10 is displaced by the conveyer 50, any impact can be absorbed by the moveable substrate receiver 18a mounted on both horizontal ends of the carrier frame 15.

Operation

Next the operation when the glass substrate 11 is mounted on the carrier will be described with reference to FIG. 9 and FIG. 10.

Figure 9A:
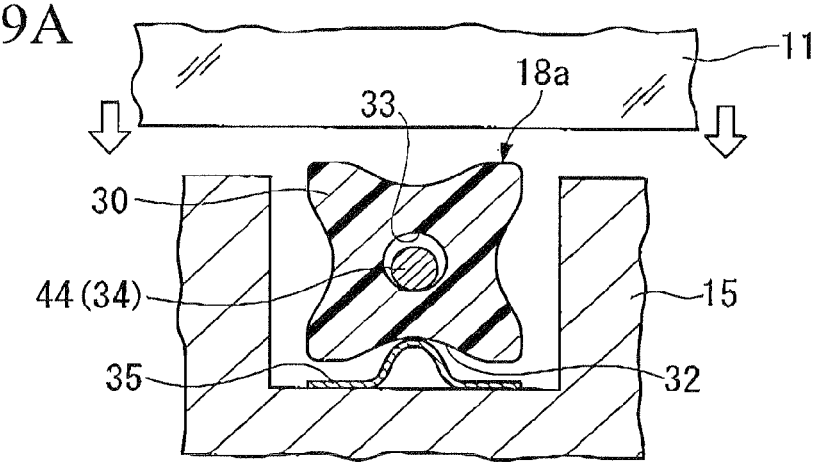
FIG. 9A is an explanatory view showing a step of mounting the glass substrate on the carrier according to the first embodiment of the present invention.

As shown in FIG. 9A, when the glass substrate 11 is not mounted, the main body 30 of the moveable substrate receiver 18a is biased upwardly by the plate spring 35 and positioned in an uppermost position.

Figure 9B:
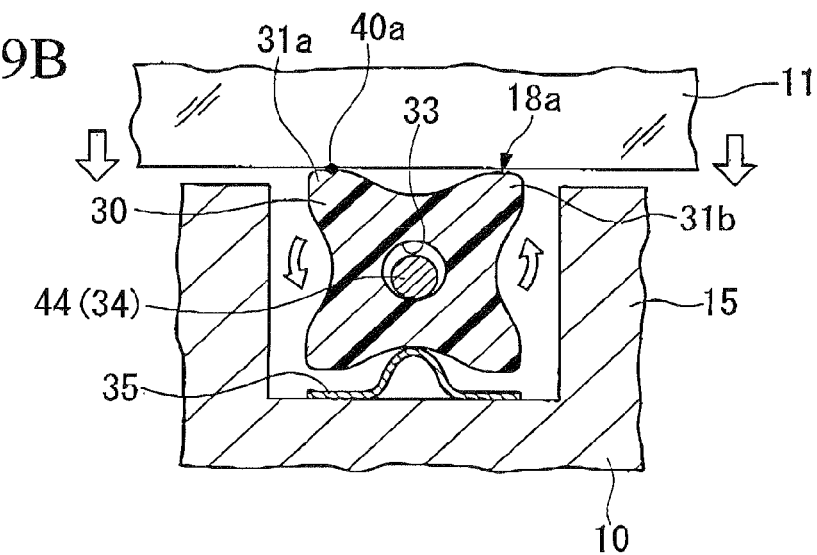
FIG. 9B is an explanatory view showing a step of mounting the glass substrate on the carrier according to the first embodiment of the present invention.

As shown in FIG. 9B, when the glass substrate 11 is mounted on the carrier frame 15 of the carrier 10, firstly one projection 31 (projection 31a) of the main body 30 makes contact with the glass substrate 11 at a contact point 40a.

Figure 9C:
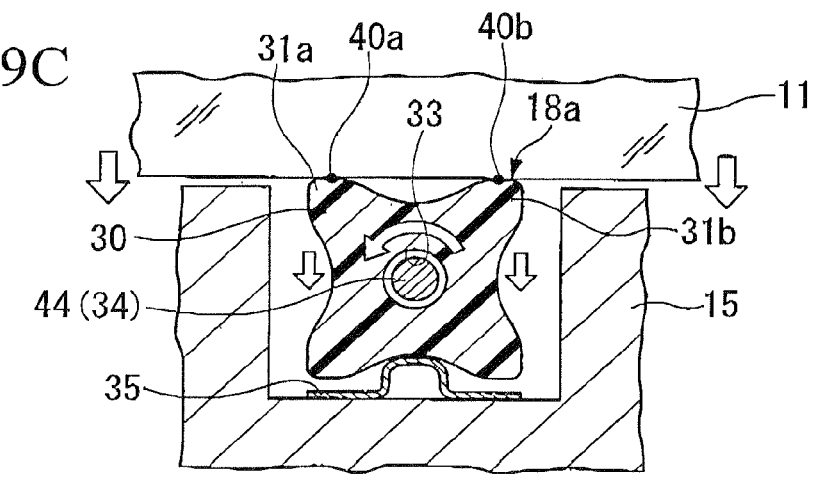
FIG. 9C is an explanatory view showing a step of mounting the glass substrate on the carrier according to the first embodiment of the present invention.

As shown in FIG. 9C, the main body 30 is displaced downwardly when the glass substrate 11 undergoes further downward displacement as a result of a load. The main body 30 is rotated by deformation of the plate spring 35 causing a projection 31b adjacent to the projection 31a to make contact with the glass substrate 11 at a contact point 40b. Consequently the glass substrate 11 and the moveable substrate receiver 18a come into contact at two points.

Figure 10A:
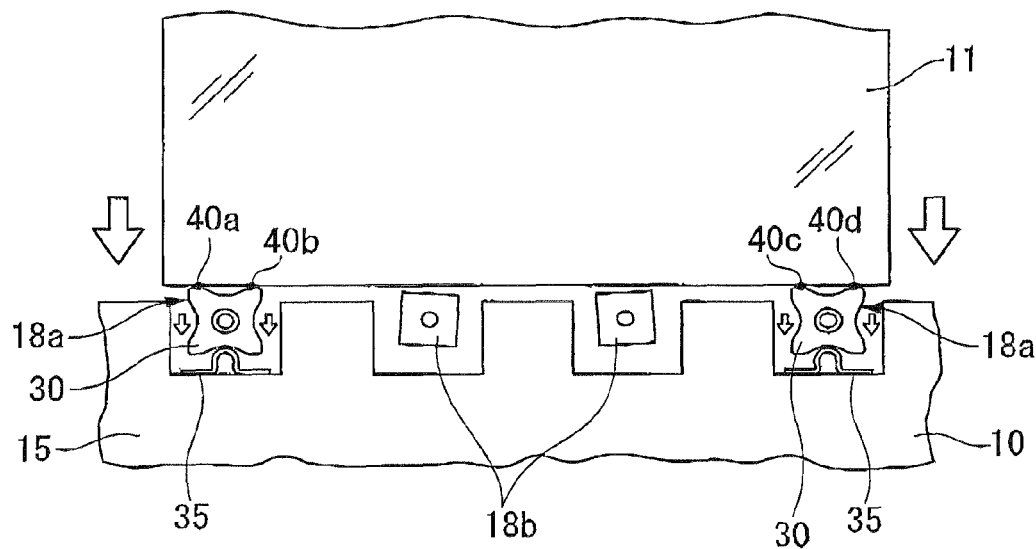
FIG. 10A is an explanatory view showing a subsequent step to that shown in FIG. 9.

As shown in FIG. 10A, the above operation enables respectively two points of contact by the moveable substrate receiver 18a on both sides of the carrier frame 15 with the glass substrate 11 for a total of four points of contact (contact points 40a-40d). Thereafter the glass substrate 11 displaces downwardly as a result of the load of the glass substrate 11. Since the plate spring 35 abuts downwardly onto the main body 30 of the moveable substrate receiver 18a, the main body 30 displaces downwardly as the plate spring 35 deforms. In other words, the glass substrate 11 displaces downwardly while any impacts resulting from the load of the glass substrate 11 are absorbed.

Figure 10B:
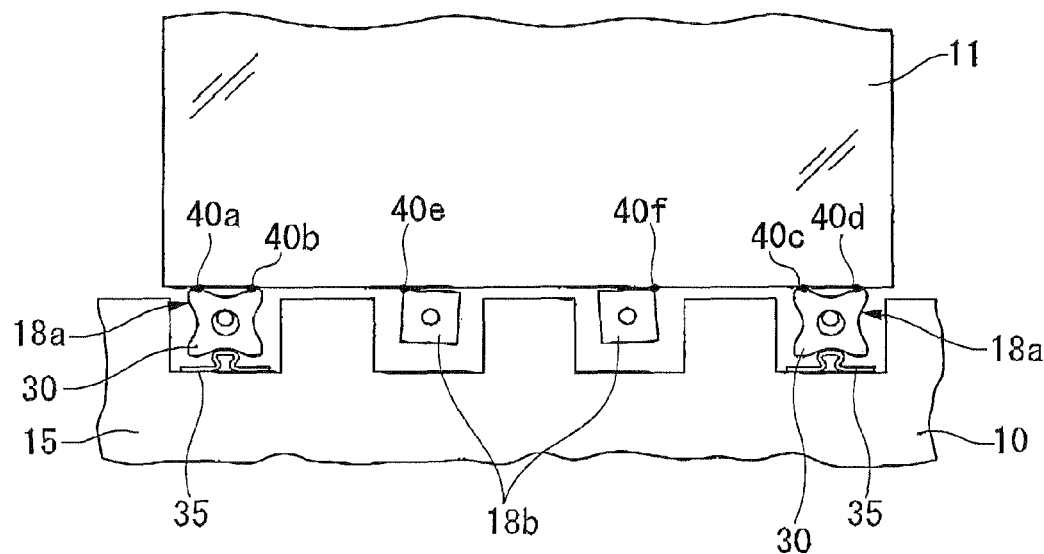
FIG. 10B is an explanatory view showing a subsequent step to that shown in FIG. 9.

As shown in FIG. 10B, the glass substrate 11 undergoes further downward displacement, displaces to a position at which the glass substrate 11 abuts with the fixed substrate receiver 18b and becomes mounted on the carrier 10. At this time, the fixed substrate receiver 18b and the glass substrate 11 make respective points of contact at one contact point for a total of two contact points (line contact) (contact points 40e, 40f). When the fixed substrate receiver 18b is mounted in a horizontal orientation with the glass substrate 11, surface contact is enabled rather than point contact.

The glass substrate 11 is supported at respectively two points by the moveable substrate receiver 18a for a total of four points and is also supported at respectively one point by the fixed substrate receiver 18b for a total of two points. Thus, the glass substrate 11 is supported at a total of six points.

Furthermore, the six-point support described above is enabled by placing the load supported by the moveable substrate receiver 18a and the fixed substrate receiver 18b into a relationship of 1:2 by adjusting the strength of the plate spring 35. For example, when the load of the glass substrate 11 is 6 kg, 1 kg may be respectively supported by the moveable substrate receiver 18a on both sides and 2 kg may be respectively supported by the respective fixed substrate receivers 18b.

The peripheral edge section of the glass substrate 11 is pressed onto the mask 20 of the carrier frame 15 by a clamp 19 mounted on a peripheral edge of the opening 21 and the glass substrate 11 is fixed to and supported by the carrier 10.

After mounting the glass substrate 11 in the above manner to the carrier 10, a film deposition process is conducted with respect to the glass substrate 11. When the film deposition process is completed with respect to the glass substrate 11, the glass substrate 11 is removed from the carrier 10. By repetition of these steps, the moveable substrate receiver 18a in particular tends to be exposed to stress caused by the initial load when mounting on the glass substrate 11. Thus, when wear occurs on the projection 31 of the main body 30, there is the possibility that the horizontal level of the glass substrate 11 will not be maintained.

Since the main body 30 is mounted simply by use of a bolt 34 on the carrier frame 15, the main body 30 can be simply removed by removing the bolt 34. Consequently the direction of the main body 30 may be varied (rotated) so that a projection 31 other than the projection 31 undergoing wear is positioned on an upper end and remounted on the carrier frame 15. In this manner, the glass substrate 11 can be placed into abutment with a projection 31 which has not undergone wear to thereby maintain the horizontal level of the glass substrate 11. Since the shape of the main body 30 is quadrilateral, the above operation can be performed four times with a single main body 30 and as a result, the component life of the main body 30 is four times greater than a conventional component.

According to the present embodiment, a plurality of projections 31 extending radially from the rotational center of the main body 30 is formed on the main body 30 of the moveable substrate 11.

In this case, when the glass substrate 11 abuts with the moveable substrate receiver 18a, the glass substrate 11 firstly makes one point (the contact point 40a) of contact with the projection 31a of the main body and the load of the glass substrate 11 is applied to the moveable substrate receiver 18a. Thus, since the main body 30 rotates and the glass substrate 11 makes contact with the adjacent projection 31b, support of the glass substrate 11 at two points can be ensured with a single moveable substrate receiver 18a. Therefore, since the concentration of stress on the glass substrate 11 is mitigated, the occurrence of cracks in the substrate 11 can be prevented. As a result, productivity can be improved in manufacturing steps for the glass substrate 11.

A plate spring 35 is provided in order to abut with the main body 30 of the moveable substrate receiver 18a and bias the main body 30 towards the glass substrate 11.

When the glass substrate 11 abuts with the moveable substrate receiver 18a, since the plate spring 35 enables abutment while absorbing the impact force resulting from the load of the glass substrate 11, the occurrence of cracks in the glass substrate 11 can be prevented.

The main body 30 of the moveable substrate receiver 18a may be formed from resin.

In this case, since the main body 30 of the moveable substrate receiver 18a is formed from a resilient material constituted by resin, when the glass substrate 11 abuts with the moveable substrate receiver 18a, the occurrence of cracks in the glass substrate 11 can be prevented.

The main body 30 of the moveable substrate receiver 18a may be mounted detachably.

In this case, when the projection 31 abutting with the glass substrate 11 undergoes temporal wear, the main body 30 may be removed, rotated and re-mounted so that another projection 31 abuts with the glass substrate 11. In this manner, the main body 30 of the moveable substrate receiver 18a can be continuously used. Therefore, the long-term durability of the main body 30 can be improved.

Furthermore, the moveable substrate receiver 18a is mounted on the carrier 10 which supports the glass substrate 11.

Thus, suitable mounting of the moveable substrate receiver 18a on the carrier 10 plays the role of receiving the load of the glass substrate 11 and the role of an interference member when the glass substrate 11 deviates to the left or right when conveyed.

Additionally, the moveable substrate receiver 18a is mounted on the carrier 10 which supports the glass substrate 11 in an upright position so that the moveable substrate receiver 18a abuts with the lower side of the glass substrate 11.

Thus, when the glass substrate 11 is mounted on the carrier 10, the load of the glass substrate 11 is accurately received by the moveable substrate receiver 18a. Furthermore, since there are two supporting points on a single moveable substrate receiver 18a, the load of the glass substrate 11 can be dispersed. Thus, the occurrence of cracks in the glass substrate 11 can be prevented.

The single moveable substrate receiver 18a and the fixed substrate receiver 18b abutting with the glass substrate 11 can be mounted along the lower side of the glass substrate 11 and the moveable substrate receiver 18a can be mounted more towards the glass substrate 11 than the fixed base p receiver 18b. After abutting with the moveable substrate receiver 18a, the glass substrate 11 abuts with fixed base substrate 18b so as to be supported by the carrier 10.

In this case, when the glass substrate 11 is mounted on the carrier 10, firstly the moveable substrate receiver 18a abuts with the glass substrate 11 and the glass substrate 11 is supported while the impact force resulting from the load of the glass substrate 11 is absorbed. The main body 30 displaces downwardly due to the load of the glass substrate 11 and the fixed substrate receiver 18b and the glass substrate 11 abut to thereby enable support of the glass substrate 11. As a result, the occurrence of cracks in the glass substrate 11 can be prevented.

Furthermore, it is possible to improve productivity in the manufacturing steps for the glass substrate 11.

Since the glass substrate 11 can be supported at a plurality positions and the load of the glass substrate 11 can be dispersed and supported by the moveable substrate receiver 18a and the fixed substrate receiver 18b, the glass substrate 11 can be stably supported and the occurrence of cracks in the glass substrate 11 can be prevented.

Second Embodiment

A second embodiment of the present invention will be described hereafter making reference to FIG. 11. Since the arrangement of this embodiment differs from the first embodiment only with respect to the arrangement of the moveable substrate receiver and in other respects in substantially the same, the same sections are designed with the same reference numerals in order to avoid repetition of detailed description.

Figure 11:
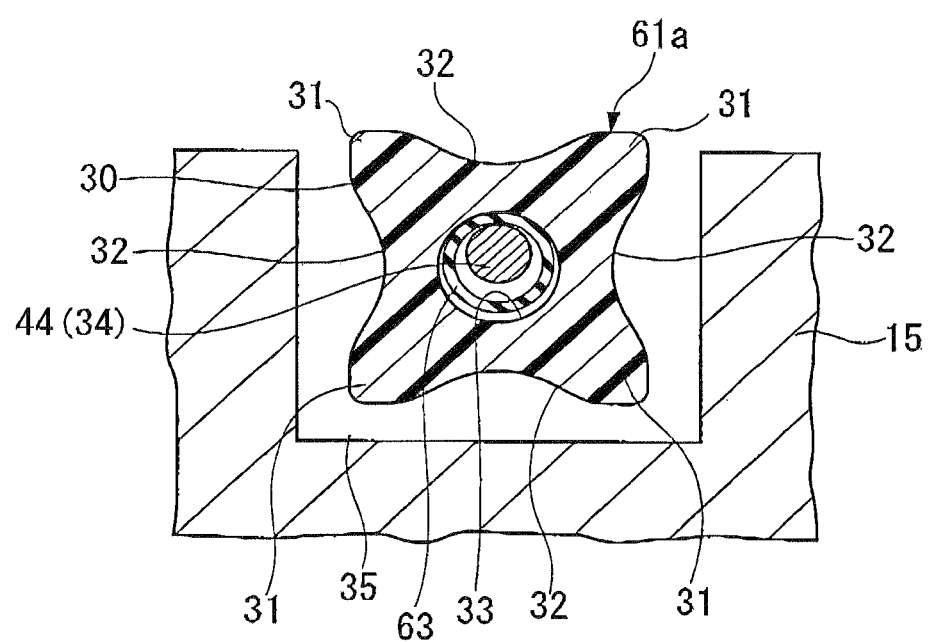
FIG. 11 is a sectional view showing the moveable substrate receiver mounted on the carrier frame according to a second embodiment of the present invention.

FIG. 11 is a sectional view showing the moveable substrate receiver mounted on the carrier frame.

As shown in FIG. 11, a moveable substrate receiver 61a includes a main body 30 and a ring-shaped resilient member 63 interposed between the main body 30 and the shaft 44 of the bolt 34. The resilient member 63 is formed into a cylindrical shape using a heat resistant material. When the glass substrate 11 is not in abutment with (mounted on) the moveable substrate receiver 61a, the main body 30 is in an uppermost position. When the glass substrate 11 is in abutment with the moveable substrate receiver, the resilient member 63 is compressed and the moveable substrate receiver 61a displaces downwardly while rotating. The moveable substrate receiver 61a is formed from a resinous material having resilient characteristics or rubber. More precisely, Teflon (Registered Trademark), Viton (Registered Trademark), fluorocarbon rubber or silicon rubber is preferably used taking into account use under vacuum conditions and use in a high-temperature environment.

In addition to the operational effect of the first embodiment, when the projection 31 abutting with the glass substrate 11 undergoes temporal wear, without removing the main body 30, a the main body 30 can be simply rotated so that another projection 31 is placed into abutment with the glass substrate 11. In this manner, it is possible to enable continuous use of the main body 30 of the moveable substrate receiver 18a with a simple method and to improve the component durability of the main body 30.

The technical scope of the present invention is not limited to the above embodiments, and includes various modifications to the above embodiments without departing from the spirit of the present invention. In other words, the precise materials or the arrangement given in the embodiments is merely one example which may be suitably modified.

For example, in this embodiment, although the description was exemplified by use of a quadrilateral shaped moveable substrate receiver, as shown in FIG. 12, a multi-projection body having a substantially triangular, substantially pentagonal or substantially hexagonal shape may be used as a moveable substrate receiver enabling support at two points on the glass substrate.

Figure 12A:
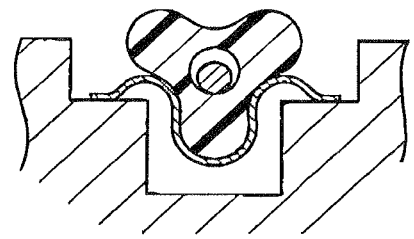
FIG. 12A is an explanatory view showing another aspect of the moveable substrate receiver in which the outer shape is triangular according to an embodiment of the present invention.
Figure 12B:
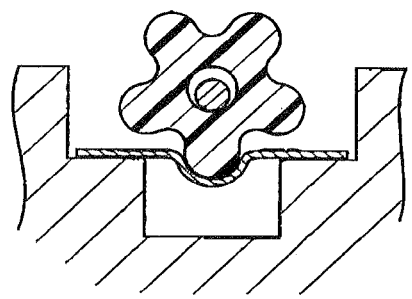
FIG. 12B is an explanatory view showing another aspect of the moveable substrate receiver in which the outer shape is pentagonal according to an embodiment of the present invention.

When a polygonal shape having an odd number of sides as shown in FIG. 12A or FIG. 12B is used, if disposed to ensure two points of contact with the glass substrate on the upper end of the moveable substrate receiver, one projection is positioned on a lower end. In this case, when the plate-spring is formed as an indentation abutting the with the lower-end projection, the moveable substrate receiver has the same operation the above embodiment.

Figure 12C:
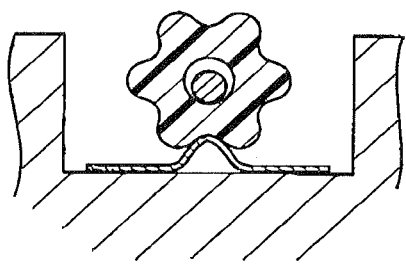
FIG. 12C is an explanatory view showing another aspect of the moveable substrate receiver in which the outer shape is hexagonal according to an embodiment of the present invention.

When a polygonal shape having an even number of sides as shown in FIG. 12C is used, the moveable substrate receiver has the same operation the above embodiment since a plate spring is provided having substantially the same shape as the present embodiment.

Figure 13:
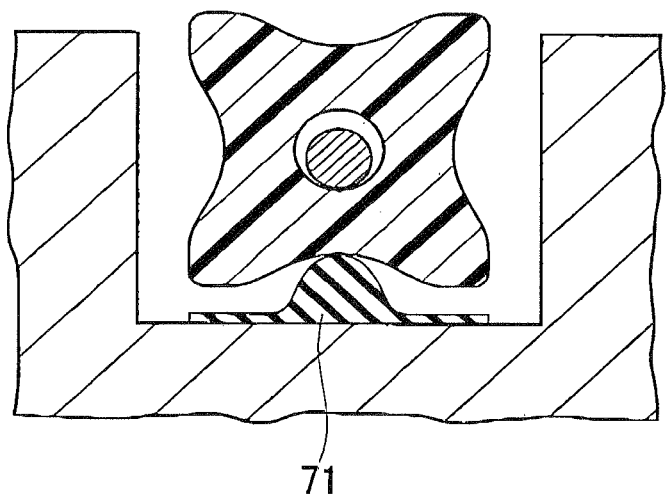
FIG. 13 is an explanatory view showing another aspect of the moveable substrate receiver according to an embodiment of the present invention.
Figure 14:
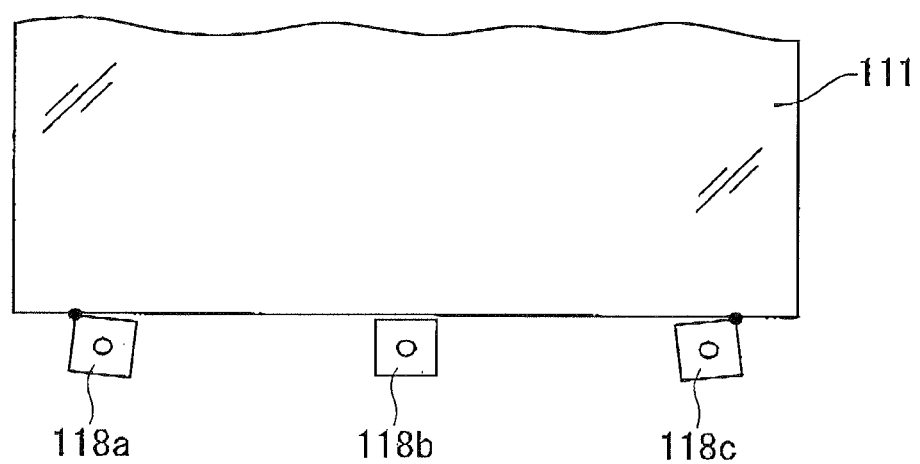
FIG. 14 is an explanatory view showing a conventional orientation of the substrate receiver and the glass substrate.

In the present embodiment, although the description was exemplified by provision of a biasing member such as a plate spring on the moveable substrate receiver, as shown in FIG. 13, a resilient member 71 having resilient characteristics may be provided. The resilient member 71 may be formed from the same materials as the resilient member in the second embodiment described above. This arrangement enables an operational effect which is substantially the same as the first embodiment described above.

In the present embodiment, although the description was exemplified by respectively disposing of two moveable substrate receivers and fixed substrate receivers along a lower side of the glass substrate, only moveable substrate receivers may be provided.

Furthermore, in the present embodiment, although the description was exemplified by abutment and mounting on the fixed substrate receivers after the glass substrate abuts with the moveable substrate receiver, an arrangement is possible in which the glass substrate normally only abuts with the moveable substrate receiver, and the glass substrate also abuts with the fixed substrate receivers only when an impact load is applied such as when the glass substrate is displaced by a transfer device.

INDUSTRIAL APPLICABILITY

According to the supporting member and the carrier of the present invention, the occurrence of cracks in the substrate can be prevented and productivity in the substrate manufacturing steps is improved.

What is claimed is:

1. A supporting member comprising:
a supporting member main body mounted to rotate freely, including a plurality of projections extending radially from a central rotation axis; and
a biasing member abutting with the supporting member main body to bias the supporting member main body towards the substrate,
wherein two adjacent projections of a plurality of the projections are configured to support a substrate in an upright position with being in contact with one side of the substrate.

2. The supporting member according to claim 1, wherein a resilient member is interposed between the supporting member main body and the central rotation axis.

3. The supporting member according to claim 1, wherein the supporting member main body is formed from resin.

4. The supporting member according to claim 1, wherein the supporting member main body is mounted to be detachable.

5. A carrier supporting the substrate comprising:
a supporting member having a supporting member main body mounted to rotate freely, including a plurality of projections extending radially from a central rotation axis, a biasing member abutting with the supporting member main body to bias the supporting member main body towards the substrate, and two adjacent projections of a plurality of the projections configured to support a substrate in an upright position with being in contact with one side of the substrate.

6. The carrier supporting the substrate according to claim 5, wherein
the supporting member is provided thereon so that the two adjacent projections contacts a lower side of the substrate.

7. The carrier supporting the substrate according to claim 6, wherein
the supporting member and a fixed supporting member configured to be in contact with the substrate are mounted along the lower side of the substrate, and the supporting member is mounted more towards the substrate than the fixed supporting member, and
the substrate contacts the fixed supporting member after contacting the supporting member so as to be supported by the fixed supporting member.

8. A method of supporting a substrate using a supporting member comprising:
providing the supporting member having a supporting member main body mounted to rotate freely, including a plurality of projections extending radially from a central rotation axis, a biasing member abutting with the supporting member main body to bias the supporting member main body towards the substrate, and two adjacent projections of a plurality of the projections configured to support a substrate in an upright position with being in contact with one side of the substrate,
a first step that one of the two adjacent projections contacts the substrate by disposing the substrate on a carrier frame of the carrier,
a second step that the supporting member main body moves downwardly by displacing the substrate downwardly with the load of the substrate to deform a biasing member,
a third step that the other of the two adjacent projections contacts the substrate by rotating the supporting member main body by deforming the supporting member to support the substrate with the two adjacent projection of one supporting member.

9. The method of supporting a substrate using the supporting member according to claim 8 further comprising:
providing a fixed supporting member configured to be contact with the substrate mounted along the lower side of the substrate, and the supporting member being mounted more towards the substrate than the fixed supporting member,
a fourth step that the substrate contacts the fixed supporting member in single point by displacing the substrate further downward with the load of the substrate and so that the substrate is supported with the supporting member and the fixed supporting member.

* * * * *